United States Patent
Song et al.

(10) Patent No.: US 9,778,689 B2
(45) Date of Patent: Oct. 3, 2017

(54) FLEXIBLE PANEL, DISPLAY APPARATUS AND WEARABLE DEVICE

(71) Applicant: BOE TECHNOLOGY GROUP CO., LTD., Beijing (CN)

(72) Inventors: Song Song, Beijing (CN); Kazuyoshi Nagayama, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/913,257

(22) PCT Filed: Aug. 20, 2015

(86) PCT No.: PCT/CN2015/087590
§ 371 (c)(1),
(2) Date: Feb. 19, 2016

(87) PCT Pub. No.: WO2016/161741
PCT Pub. Date: Oct. 13, 2016

(65) Prior Publication Data
US 2017/0038794 A1 Feb. 9, 2017

(30) Foreign Application Priority Data
Apr. 8, 2015 (CN) .......................... 2015 1 0163681

(51) Int. Cl.
*G06F 1/16* (2006.01)
*H05K 5/00* (2006.01)
(Continued)

(52) U.S. Cl.
CPC ............. *G06F 1/163* (2013.01); *G04G 9/007* (2013.01); *G06F 1/1641* (2013.01);
(Continued)

(58) Field of Classification Search
CPC .... G06F 1/1601; G06F 1/1613; G06F 1/1626; G06F 1/163; G06F 1/1633; G06F 1/1637; G06F 1/1641; G06F 1/1652
(Continued)

(56) References Cited

U.S. PATENT DOCUMENTS 7,558,057 B1 * 7/2009 Naksen ................. G06F 1/1613
361/679.3
7,667,962 B2 * 2/2010 Mullen ................. G06F 1/1624
359/461
(Continued)

FOREIGN PATENT DOCUMENTS

| CN | 101573879 | 11/2009 |
|---|---|---|
| CN | 103050064 A | 4/2013 |

(Continued)

OTHER PUBLICATIONS

International Search Report and Written Opinion with English Language Translation, dated Jan. 4, 2016, Application No. PCT/CN2015/087590.
(Continued)

*Primary Examiner* — Anthony Haughton
(74) *Attorney, Agent, or Firm* — Blakely Sokoloff Taylor & Zafman

(57) ABSTRACT

A flexible panel, a display apparatus and a wearable device are disclosed.
The flexible panel comprises a first crease extending in a first direction, a second crease extending in a second direction and intersecting with the first crease, and a plurality of display units divided by the first crease and the second crease, the plurality of display units are folded and/or unfolded by the first crease and the second crease. When the flexible panel is in use, the plurality of display units may be completely unfolded by means of the creases, so that a usable area of the screen may be increased, the user expe-
(Continued)

rience can be improved; when the user does not use the flexible panel, the display units may be overlapped by means of the crease, which may change the shape of the panel, and thus the flexible panel is convenient to carry.

15 Claims, 4 Drawing Sheets

(51) Int. Cl.
    *H05K 7/00*     (2006.01)
    *G09F 9/00*     (2006.01)
    *G04G 9/00*     (2006.01)
    *G09F 9/30*     (2006.01)
    *G09F 21/02*     (2006.01)

(52) U.S. Cl.
    CPC .............. *G06F 1/1652* (2013.01); *G09F 9/00* (2013.01); *G09F 9/301* (2013.01); *G09F 21/02* (2013.01)

(58) Field of Classification Search
    USPC .............. 361/679.21–679.3, 679.55, 679.56, 361/679.03; 349/56–60; 345/905
    See application file for complete search history.

(56) References Cited

U.S. PATENT DOCUMENTS

| | | | | |
|---|---|---|---|---|
| 7,782,274 | B2* | 8/2010 | Manning | G06F 1/1616 345/1.1 |
| 8,380,327 | B2* | 2/2013 | Park | G05B 11/01 29/592.1 |
| 8,605,421 | B2* | 12/2013 | Verschoor | G06F 1/1652 361/679.21 |
| 8,654,519 | B2* | 2/2014 | Visser | G09F 9/00 361/679.21 |
| 2002/0021622 | A1* | 2/2002 | Baroche | G04B 37/0016 368/10 |
| 2007/0279315 | A1* | 12/2007 | Laves | G06F 1/1615 345/1.1 |
| 2013/0250738 | A1 | 9/2013 | Kim et al. | |
| 2014/0375530 | A1* | 12/2014 | Delaporte | G06F 1/1616 345/1.3 |
| 2015/0022561 | A1* | 1/2015 | Ikeda | G06F 1/1652 345/690 |
| 2015/0062525 | A1 | 3/2015 | Hirakata | |

FOREIGN PATENT DOCUMENTS

| | | |
|---|---|---|
| CN | 103578356 | 2/2014 |
| CN | 103713436 | 4/2014 |
| CN | 103792839 A | 5/2014 |
| CN | 104346999 | 2/2015 |
| EP | 1754 424 A1 | 2/2007 |

OTHER PUBLICATIONS

Office Action in Chinese Application No. 201510163681.8 dated Nov. 30, 2016, with English translation. 10 pages.

* cited by examiner

— — — outward-folding

— · — · — inward-folding

— — — outward-folding
— · — · — inward-folding

FLEXIBLE PANEL, DISPLAY APPARATUS AND WEARABLE DEVICE

RELATED APPLICATIONS

The present application is the U.S. national phase entry of PCT/CN2015/087590, with an international filing date of Aug. 20, 2015, which claims the benefit of Chinese Patent Application NO. 201510163681.8, filed on Apr. 8, 2015, the entire disclosure of which are incorporated herein by reference.

FIELD OF THE INVENTION

The invention relates to the field of display, and particularly to a flexible panel, a display apparatus and a wearable device.

BACKGROUND OF THE INVENTION

Recently, wearable devices have been gradually popularized among users due to characteristics of being easy to wear and ready for use by the users. Currently, there are different forms of electronic devices such as glasses, visors and watches. A smart watch, being a relatively common wearable smart device, may record real-time data about time, exercise and sleep in daily life, and users may check these data in real time by means of such smart watch. Also these data may be synchronized with other electronic devices, hence quality of people's life may be greatly improved.

However, for ease of portability, a screen of the smart watch in the prior art generally has a relatively smaller size, thereby causing a problem of poor experience when the user checks information on the screen.

SUMMARY OF THE INVENTION

A technical problem to be solved by embodiments of the invention is to provide a wearable device which has a relatively large screen and is easy to carry.

A technical solution of an embodiment of the invention provides a flexible panel, which may comprise a first crease extending in a first direction, a second crease extending in a second direction and intersecting with the first crease, and a plurality of display units divided by the first crease and the second crease. The plurality of display units may be folded and/or unfolded by the first crease and the second crease.

Further, the flexible panel may comprise a plurality of the first creases, each of the first creases comprising a plurality of first sub-creases divided by the second crease, folding directions for the first sub-creases in the same first crease may be identical, and folding directions for two adjacent first creases may be opposite, each of the second creases may comprise a plurality of second sub-creases divided by the plurality of the first creases, and folding directions for two adjacent second sub-creases in the same second crease may be opposite.

Further, the flexible panel may comprise a plurality of the second creases, and among two adjacent second creases, folding directions for two second sub-creases aligned in the first direction may be opposite.

Further, each first sub-crease and each second sub-crease may be both of a linear structure, each second sub-crease may be parallel to the second direction, each first sub-crease may be inclined relative to the first direction and have a same inclination angle, and inclining directions for any two adjacent first sub-creases in the first direction may be opposite, inclining directions for any two adjacent first sub-creases in the second direction may be identical.

Further, the flexible panel may comprise a plurality of gate circuit regions separated from each other, each gate circuit region corresponding to one row of display units in the second direction.

Further, the flexible panel may further comprise a support structure, which is used for supporting the plurality of display units when the plurality of display units are unfolded, so as to maintain an unfolded state of the plurality of display units.

Further, the flexible panel may be rectangular after being unfolded, the support structure may comprise retractable support members arranged at two display units which will be located diagonally when the flexible panel is unfolded, and the retractable support members at the two display units can be mutually connected after being stretched, so as to maintain the unfolded state of the plurality of display units.

Another embodiment of the invention provides a display apparatus, which may comprise the flexible panel according to any one of above embodiments of the invention.

A further embodiment of the invention provides a wearable device, which may comprise the display apparatus mentioned above and a wearable component for fixing the display apparatus to the human body.

Further, the wearable component may be a watchband.

For the flexible panels provided by the embodiments of the invention, the display units thereof may be folded and unfolded by the creases. When the flexible panel is in use, the plurality of display units may be completely unfolded by means of the creases, so that a usable area of the screen may be increased, the user experience can be improved; when the user does not use the flexible panel, the display units may be overlapped by means of the crease, which may change the shape of the panel, and thus the flexible panel is convenient to carry.

DETAILED DESCRIPTION OF THE INVENTION

Embodiments of the invention will be further explained below in detail in connection with the appended drawings.

The following embodiments are intended to illustrate the invention, but not to limit the scope of the invention An embodiment of the invention provides a flexible panel, the flexible panel comprises a first crease extending in a first direction, a second crease extending in a second direction and intersecting with the first crease, and a plurality of display units divided by the first crease and the second crease, and the plurality of display units can be folded and/or unfolded by the first crease and the second crease.

Figure 1:
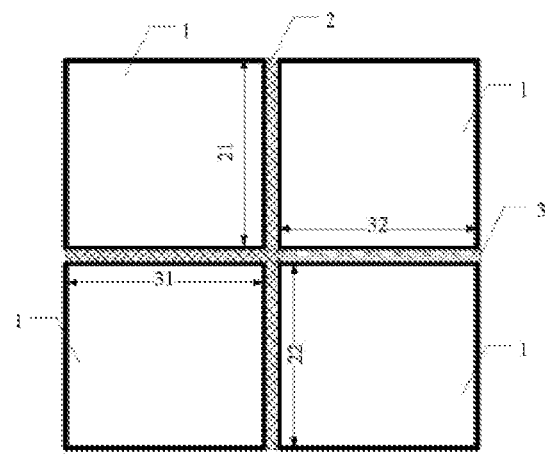
FIG. 1 is a schematic view of a flexible panel provided by an embodiment of the invention.

Referring to FIG. 1, which is a schematic view of a flexible panel provided by an embodiment of the invention. The flexible panel comprises a first crease 2 extending in a first direction, a second crease 3 extending in a second direction and intersecting with the first crease 2. The first direction may be approximately perpendicular to the second direction, for example, the first direction may be a longitudinal direction, the second direction may be a transverse direction. The flexible panel can be divided into four display units 1 by the first crease 2 and the second crease 3, and the four display units may be folded and/or unfolded by the first crease 2 and the second crease 3.

In this embodiment, for the above flexible panel, the numbers of the first crease and the second crease are both one, and the first crease 2 is divided into two first sub-creases by the second crease 3, i.e., a first sub-crease 21 between two display units at the upper left and the upper right and another first sub-crease 22 between two display units at the lower left and the lower right. In an embodiment, each of the two first sub-creases can be folded outwards (i.e. a direction from a user to a screen). Similarly, the second crease 3 may be divided into two second sub-creases by the first crease 2, i.e., a second sub-crease 31 between two display units at the upper left and the lower left, and another second sub-crease 32 between two display units at the upper right and the lower right. The second sub-crease 31 can be folded outwards, and the second sub-crease 32 can be folded inwards (i.e. a direction from the screen to the user).

Figure 2:
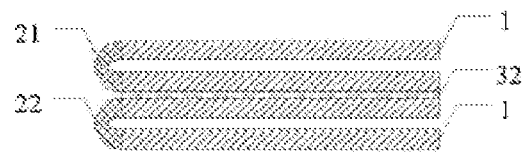
FIG. 2 is a schematic view showing a folded flexible panel as shown in FIG. 1.

For example, FIG. 2 shows a structure after the four display units mentioned above are folded along the creases in the flexible panel, in which the four display units can overlap each other, thereby display apparatuses having such a flexible panel can be convenient to carry.

For the flexible panel provided by the embodiment of the invention, the display units may be folded or unfolded by means of the creases (including the first creases and the second creases). Therefore, when the flexible panel is in use, the plurality of display units may be completely unfolded by means of the creases, so that a usable area of the screen may be increased, and the user experience can be improved; when the user does not use the flexible panel, the display units may be overlapped through the creases, which may change the shape of the panel, and thus the flexible panel may be convenient to carry.

For the flexible panel provided in the embodiment of the invention, each of the display units may rotate about the crease at the periphery, thereby completing folding. The first crease and the second crease may be of a linear design as shown in FIG. 1, and other design manners can also be employed depending on specific situations.

In addition, in the flexible panel of the above embodiment, a pixel density at the crease may be different from that in the display units. And the wiring for the flexible panel may be in the form of a double-deck wiring or a crank wiring (i.e., bent wiring or Z-shaped wiring), and so on.

Figure 3:
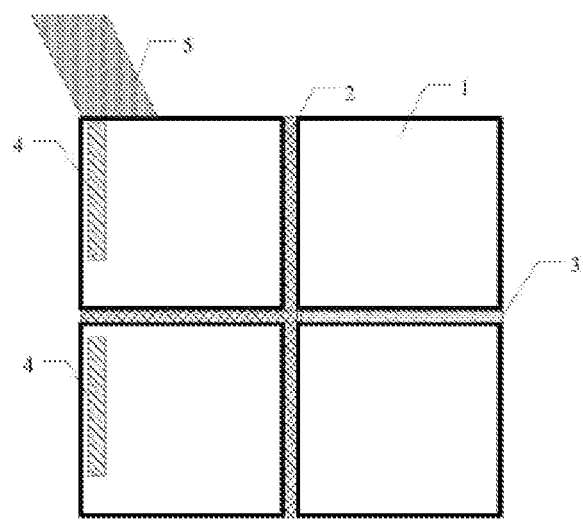
FIG. 3 is a schematic view of a flexible panel provided by another embodiment of the invention.

In an embodiment, a gate circuit of the flexible panel may be provided in a region outside the creases, so as to reduce or avoid damage to the gate circuit in the panel caused by folding. For example, a plurality of gate circuit regions separated from each other may be arranged in the flexible panel, each of the gate circuit regions may be provided with a GOA (Gate Driver on Array) unit, thereby realizing subsection arrangement of the GOA units in the flexible display panel. As shown in FIG. 3, a flexible circuit board 5 may be disposed at a upper left corner of the flexible panel, and a gate circuit region 4 is disposed at the left side of each row of display units in the second direction to drive this row of display units, therefore, damage to the gate circuit caused by the crease regions during the folding process may be reduced or avoided. The flexible circuit board 5 is electrically connected with the flexible panel, so as to provide data and clock signals to the flexible panel.

For the flexible panel provided by the embodiment of the invention, the creases thereof may be made of an elastic material, so that the plurality of display panels can be automatically folded in case no external force is applied to the flexible panel; and when the flexible panel is in use, the flexible panel may be changed to an unfolded state by applying an external force to it.

In another embodiment, to enable the flexible panel to maintain the unfolded state when used by a user, the flexible panel may further comprise a support structure, which is configured to support the plurality of display units when the display units in the flexible panels are unfolded, so as to maintain the unfolded state of these display units. For example, for the flexible panel as shown in FIG. 1, retractable support members may be disposed in two display units which will be located diagonally after the flexible panel is unfolded. Therefore, when the flexible panel is completely unfolded, the retractable support members of the two display units may be mutually connected after being stretched, so as to maintain the unfolded state of the plurality of display units in the flexible panel.

Figure 4:
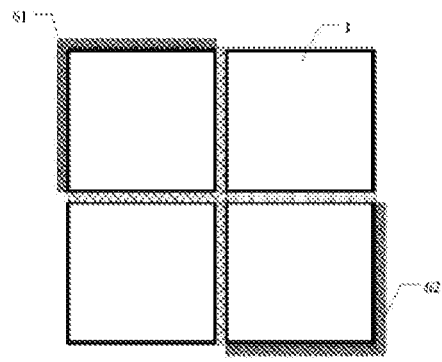
FIG. 4 is a schematic view of a flexible panel provided by another embodiment of the invention.
Figure 5:
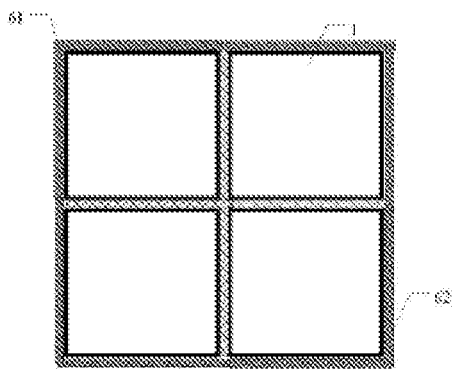
FIG. 5 is a schematic view showing the flexible panel shown in FIG. 4 in which a support structure is stretched.

For example, referring to FIG. 4, the flexible panel may be rectangular after being unfolded, a retractable support member 61 is arranged at the display unit at the upper left, a retractable support member 62 is disposed at the display unit at the lower right, and each of the retractable support members comprises a longitudinal portion and a transverse portion. When the flexible panel is in use, as shown in FIG. 5, the longitudinal portion and the transverse portion of each retractable support member may be firstly stretched, and the transverse portion of the retractable support member 61 is fixedly connected with the longitudinal portion of the retractable support member 62, the longitudinal portion of the retractable support member 61 is fixedly connected with the transverse portion of the retractable support member 62, so that a support frame structure located at the periphery of the flexible panel may be formed, and the unfolded state of the flexible panel may be maintained by the support frame structure. Connection between the two retractable support members may be realized by a slot, for example, the slot may be provided in one retractable support member, and the other support member may be inserted into the slot after the support members are stretched, thus the connection may be completed.

When the flexible panel is to be used, the connection between the retractable support member 61 and the retractable support member 62 may be firstly dissociated, and then the longitudinal portion and the transverse portion of each retractable support member may be contracted so that their lengths are reduced, and the display units can be automatically folded under an action of an elastic force of the creases.

In addition, in various embodiments of the flexible panel of the invention, the numbers of the first crease and the second crease in the flexible panel may be respectively one, as shown in FIG. 1, and may also be more than one. When there are multiple first creases and multiple second creases, the number of display units divided by the first creases and the second creases increase accordingly.

For example, in case the flexible panel comprises a plurality of first creases and a plurality of second creases, each of the first creases may comprise a plurality of first sub-creases divided by the second crease, folding directions for the first sub-creases in the same first crease may be identical, and folding directions for two adjacent first creases may be opposite, each of the second creases may comprise a plurality of second sub-creases divided by the first crease, and folding directions for two adjacent second sub-creases in the same second crease may be opposite.

If the flexible panel comprises a plurality of the second creases, among two adjacent second creases, folding directions for two second sub-creases aligned in the first direction may be mutually opposite, so as to enable the plurality of display units in the flexible panel to be mutually overlapped after being folded.

Figure 6:
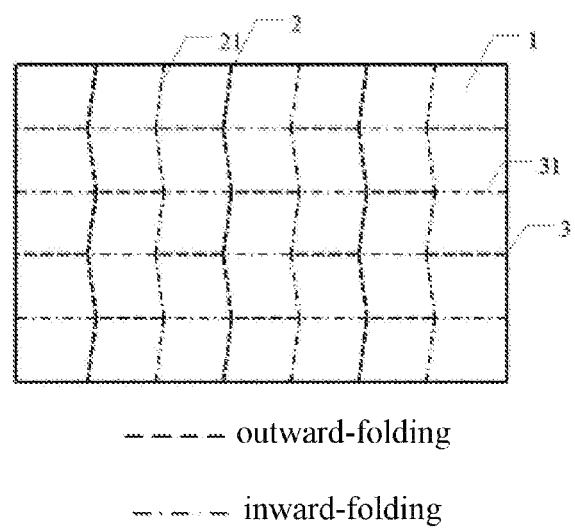
FIG. 6 is a schematic view of a flexible panel provided by yet another embodiment of the invention.

In another embodiment, in which the flexible panel comprises multiple display units, for ease of unfolding the panel, the flexible panel may employ a design manner of Miura Fold. For example, as shown in FIG. 6, in an embodiment, the flexible panel may comprise six first creases 2 extending in the first direction and four second creases 3 extending in the second direction, the first direction may be perpendicular to the second direction, for example, the first direction may be a longitudinal direction, the second direction may be a transverse direction. The flexible panel may be divided into thirty-five display units 1 by the six first creases 2 and the four second creases 3. For each of the first creases 2, it may be divided into five first sub-creases 21 by the four second creases, folding directions for the first sub-creases 21 in the same first crease may be identical, folding directions for two adjacent first creases may be opposite. For example, in the embodiment as shown in FIG. 5, from left to right, the first crease in the first column may be folded outwards, the first crease in the second column may be folded inwards, and the first crease in the third column may be folded outwards.

In addition, each of the first sub-creases may be of a linear structure, these first sub-creases may be inclined relative to the first direction and have the same inclination angle, and inclining directions for any two adjacent first sub-creases in the first direction may be opposite, inclining directions for any two adjacent first sub-creases in the second direction may be identical.

For each of the second creases 3, it may be divided into seven second sub-creases 31 by the six first creases 2. And folding directions for two adjacent second sub-creases in the same second crease may be opposite, and among two adjacent second creases, folding directions for two second sub-creases aligned in the first direction may be mutually opposite. For example, for the embodiment as shown in FIG. 6, folding directions for the seven second sub-creases of the second crease in the first row may sequentially be as follows (from left to right): an outward-folding direction, an inward-folding direction, an outward-folding direction, an inward-folding direction, an outward-folding direction, an inward-folding direction, and an outward-folding direction; for the second crease in the second row, folding directions for the seven second sub-creases may be sequentially as follows (from left to right): an inward-folding direction, an outward-folding direction, an inward-folding direction, an outward-folding direction, an inward-folding direction, an outward-folding direction, and an inward-folding direction.

In addition, each of the second sub-creases may be of a linear structure, and each second sub-crease may be parallel to the second direction.

With the above embodiments, the rapidness of unfolding the panel may be improved, the damage to the screen caused by folding may be effectively reduced during the unfolding or contracting of the panel, and the screen may be contracted to a small area as much as possible.

Figure 7:
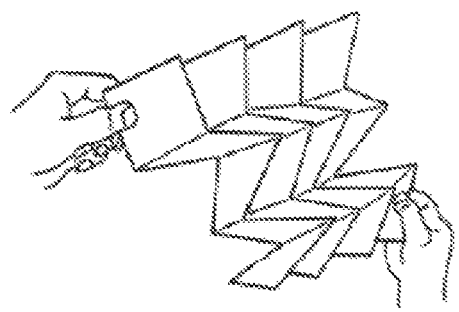
FIG. 7 is a schematic view showing an unfolding process of a flexible panel provided by yet another embodiment of the invention.

In this embodiment, the creases of the panel may be also made of an elastic material, in this way, the plurality of display units may be automatically folded under an action of an elastic force of the creases in case no external force is applied to the flexible panel, thereby the shape of the flexible panel may be changed, so that it is convenient to carry. And when used by the user, the flexible panel can be rapidly unfolded under an action of the external force, as shown in FIG. 7.

Figure 8:
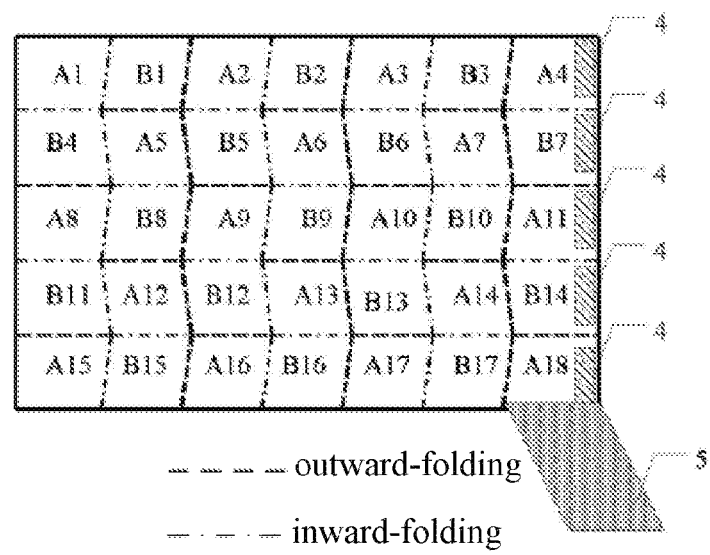
FIG. 8 is a schematic view of a flexible panel provided by yet another embodiment of the invention.

In an embodiment of the invention, two adjacent display units may be respectively arranged at two different flexible substrates, so as to reduce the damage caused by folding. As shown in FIG. 8, the flexible panel may comprise display units A1-A18 and display units B1-B17, the display units A1-A18 may be arranged at the lower-layer flexible substrate, and the display units B1-B17 may be arranged at the upper-layer flexible substrate. For example, the display units A1-A18 and the display units B1-B17 may be respectively fabricated on two different layers of PI (polyimide) films, then the flexible panel may be formed by laminating the two layers of PI films. For example, the lower-layer film may be called A film, and the upper-layer film may be called B film. Pixels may be fabricated at positions corresponding to the display units A1-A18 in the A film, and a wire made of a metal material may be used to connect the display units on the A film, also pixels may be fabricated at positions corresponding to the display units B1-B17 in the B film, and a wire made of a transparent conductive material (ITO) may be used to connect the display units on the B film. Thereafter the A film and the B film may be spliced seamlessly, so that the damage to pixel structures in the display units caused by folding may be reduced.

In case all display units in the flexible panel are arranged on one flexible substrate, less or no pixels may be fabricated at the regions of creases.

In addition, gate circuits of the flexible panel may be disposed in a region outside the crease, so as to reduce or avoid damage to the gate circuits in the panel caused by folding. For example, a plurality of gate circuit regions separated from each other may be arranged in the flexible panel, each of the gate circuit regions may be provided with a GOA unit, thereby realizing subsection arrangement of the GOA units in the flexible display panel. For example, for the embodiment as shown in FIG. 8, if the flexible panel can be unfolded from lower right to upper left, a flexible circuit board 5 may be bound at the lower right corner to give a data signal and a clock signal for the GOA units, and a gate circuit region 4 may be arranged at the right side of each row of display units in the second direction to drive this row of display units, hence, the damage to the GOA units that may be caused during the folding process can be reduced or avoided.

An embodiment of the invention further provides a display apparatus, which may comprise a display panel as described in any of the above embodiments. The display apparatus provided by the embodiment of the invention may be any product or component having display function, such as a notebook computer display screen, a liquid crystal display, a liquid crystal television, a digital photo frame, a mobile phone, and a panel computer.

Figure 9:
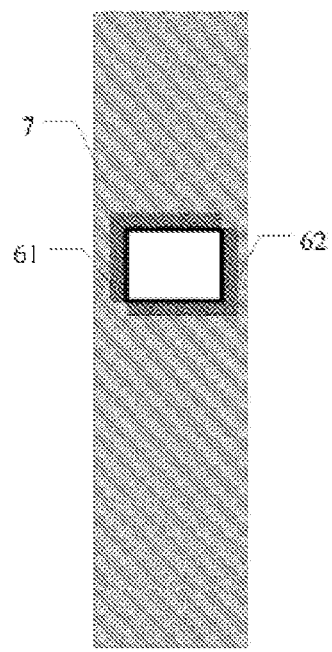
FIG. 9 is a schematic view of a wearable device provided by another embodiment of the invention.

In addition, an embodiment of the invention further provides a wearable device, which may comprise the above display apparatus and a wearable component for fixing the display apparatus to the human body. For example, the wearable device may be a watch and the like. Referring to FIG. 9, which is a schematic view of a wearable device provided by an embodiment of the invention, the wearable device may comprise the above flexible panel and the wearable component 7 (such as a watchband), and the flexible panel may be fixed to the human body by the wearable component 7, so that the portability of the flexible panel is realized.

Figure 10:
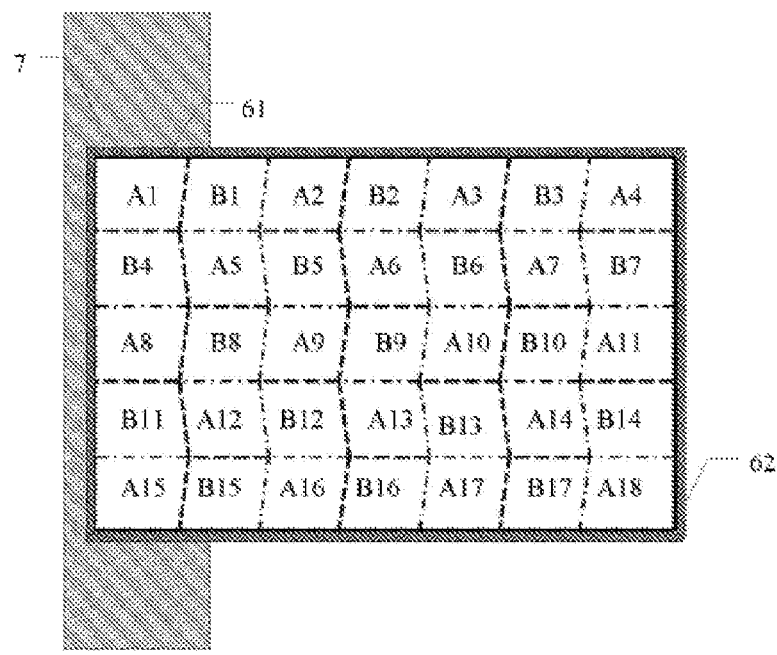
FIG. 10 is a schematic view showing the wearable device shown in FIG. 9 in which the flexible panel is unfolded.

For example, a chassis may be arranged on the wearable component 7 to accommodate a printed circuit board (PCB) and a battery, the flexible panel may be connected to the printed circuit board by a flexible circuit board, retractable support members 61 and 62 can be disposed at two display units which will be located diagonally after being unfolded. FIG. 9 shows an exemplary wearable device in which the plurality of display units of the flexible panel are folded. As shown in FIG. 10, after the flexible panel is completely unfolded, the retractable support members 61 and 62 are mutually connected after being stretched so as to maintain an unfolded state of the flexible panel.

The aforementioned embodiments are merely intended to illustrate the invention and are not intended to limit the invention. Various modifications and variations may be achieved by a person having ordinary skill in the art without departing from the spirit and the scope of the invention, and therefore, all equivalent technical solutions belong to the scope of the invention, and a protection scope of the invention should be subjected to the appending claims.

The invention claimed is:

1. A flexible panel, comprising
a first crease extending in a first direction,
a second crease extending in a second direction and intersecting with the first crease, and
a plurality of display units divided by the first crease and the second crease,
wherein the plurality of display units are folded and/or unfolded by the first crease and the second crease,
wherein the flexible panel is rectangular after being unfolded, and the flexible panel further comprises a support structure for maintaining an unfolded state of the plurality of display units when the plurality of display units are unfolded,
wherein the support structure comprises a first retractable support member and a second retractable support member respectively arranged at two display units which will be located diagonally in the rectangular when the flexible panel is unfolded, each of the first retractable support member and second retractable support member comprising a retractable longitudinal portion and a retractable transverse portion,
wherein the first retractable support member and the second retractable support member are configured such that the retractable transverse portion of the first retractable support member is connected with the retractable longitudinal portion of the second retractable support member and the retractable longitudinal portion of the first retractable support member is connected with the retractable transverse portion of the second retractable support member when the flexible panel is unfolded.

2. The flexible panel according to claim 1, wherein the flexible panel comprises a plurality of the first creases, each of the first creases comprising a plurality of first sub-creases divided by the second crease, folding directions for the first sub-creases in the same first crease are identical, and folding directions for two adjacent first creases are opposite, each of the second creases comprises a plurality of second sub-creases divided by the plurality of the first creases, and folding directions for two adjacent second sub-creases in the same second crease are opposite.

3. The flexible panel according to claim 2, wherein the flexible panel comprises a plurality of the second creases, and among two adjacent second creases, folding directions for two second sub-creases aligned in the first direction are opposite.

4. The flexible panel according to claim 3, wherein each first sub-crease and each second sub-crease are both of a linear structure, each second sub-crease is parallel to the second direction, each first sub-crease is inclined relative to the first direction and has a same inclination angle, and inclining directions for any two adjacent first sub-creases in the first direction are opposite, inclining directions for any two adjacent first sub-creases in the second direction are identical.

5. The flexible panel according to claim 1, wherein the flexible panel comprises a plurality of gate circuit regions separated from each other, each gate circuit region corresponding to one row of display units in the second direction.

6. The flexible panel according to claim 2, wherein the flexible panel comprises a plurality of gate circuit regions separated from each other, each gate circuit region corresponding to one row of display units in the second direction.

7. The flexible panel according to claim 3, wherein the flexible panel comprises a plurality of gate circuit regions separated from each other, each gate circuit region corresponding to one row of display units in the second direction.

8. The flexible panel according to claim 4, wherein the flexible panel comprises a plurality of gate circuit regions separated from each other, each gate circuit region corresponding to one row of display units in the second direction.

9. A display apparatus comprising a flexible panel, the flexible panel comprising
a first crease extending in a first direction,
a second crease extending in a second direction and intersecting with the first crease, and
a plurality of display units divided by the first crease and the second crease,
wherein the plurality of display units are folded and/or unfolded by the first crease and the second crease,
wherein the flexible panel is rectangular after being unfolded, and the flexible panel further comprises a support structure for maintaining an unfolded state of the plurality of display units when the plurality of display units are unfolded,
wherein the support structure comprises a first retractable support member and a second retractable support member respectively arranged at two display units which will be located diagonally in the rectangular when the flexible panel is unfolded, each of the first retractable support member and second retractable support member comprising a retractable longitudinal portion and a retractable transverse portion,
wherein the first retractable support member and the second retractable support member are configured such that the retractable transverse portion of the first retractable support member is connected with the retractable longitudinal portion of the second retractable support member and the retractable longitudinal portion of the first retractable support member is connected with the retractable transverse portion of the second retractable support member when the flexible panel is unfolded.

10. A wearable device, comprising the display apparatus according to claim 9 and a wearable component for fixing the display apparatus to the human body.

11. The wearable device according to claim 10, wherein the wearable component is a watchband.

12. The display apparatus according to claim 9, wherein the flexible panel comprises a plurality of the first creases, each of the first creases comprising a plurality of first sub-creases divided by the second crease, folding directions for the first sub-creases in the same first crease are identical, and folding directions for two adjacent first creases are opposite, each of the second creases comprises a plurality of second sub-creases divided by the plurality of the first creases, and folding directions for two adjacent second sub-creases in the same second crease are opposite.

13. The display apparatus according to claim 12, wherein the flexible panel comprises a plurality of the second creases, and among two adjacent second creases, folding directions for two second sub-creases aligned in the first direction are opposite.

14. The display apparatus according to claim 13, wherein each first sub-crease and each second sub-crease are both of a linear structure, each second sub-crease is parallel to the second direction, each first sub-crease is inclined relative to the first direction and has a same inclination angle, and inclining directions for any two adjacent first sub-creases in the first direction are opposite, inclining directions for any two adjacent first sub-creases in the second direction are identical.

15. The display apparatus according to claim 9, wherein the flexible panel comprises a plurality of gate circuit regions separated from each other, each gate circuit region corresponding to one row of display units in the second direction.

* * * * *